United States Patent [19]

Spacil

[11] 3,967,676

[45] July 6, 1976

[54] TRANSPORT OF HEAT AS CHEMICAL ENERGY

[75] Inventor: Henry S. Spacil, Schenectady, N.Y.

[73] Assignee: General Electric Company, Schenectady, N.Y.

[22] Filed: July 1, 1974

[21] Appl. No.: 484,801

[52] U.S. Cl.............................. 165/2; 165/DIG.17; 165/DIG.12; 165/107; 62/4; 126/263; 60/645
[51] Int. Cl.² .......................................... F28C 3/00
[58] Field of Search .................... 60/649, 645; 62/4; 126/263; 122/21; 165/2, 1, 107, 66

[56] References Cited
UNITED STATES PATENTS

| | | | |
|---|---|---|---|
| 3,198,710 | 8/1965 | Long.................................. | 62/4 X |
| 3,370,420 | 2/1968 | Johnson.............................. | 60/649 |
| 3,714,942 | 2/1973 | Fischel et al....................... | 165/66 X |

OTHER PUBLICATIONS

Dissociation–Cooling, McKisson, RL, Calif. Res. & Dev. Co., Livermore, Calif., Livermore Res. Lab. of AEC (LRL–86), 3/1954.

Primary Examiner—Albert W. Davis, Jr.
Attorney, Agent, or Firm—Leo I. MaLossi; Joseph T. Cohen; Jerome C. Squillaro

[57] ABSTRACT

At a heat source, such as a nuclear reactor, phosgene is reacted to form a mixture of carbon monoxide and chlorine. This mixture of gases is cooled by heat exchange with incoming cold phosgene and is pumped through a first pipeline at ambient temperature to an energy use area. At the energy use end of the first pipeline the gas mixture is heated in the presence of a catalyst, such as activated charcoal. The CO and $Cl_2$ react exothermically to form $COCl_2$ (phosgene) with the liberation of 26 kcal per mol of phosgene formed. The heat evolved from this reaction is released across a heat exchanger for the boiling of water and superheating of the resultant steam to a temperature in the 400°–500°C range for use as process heat or the generation of electricity. The phosgene produced is cooled and then returned to the heat source end via a second pipeline for repetition of the closed loop process described.

6 Claims, 1 Drawing Figure

U.S. Patent  July 6, 1976  3,967,676
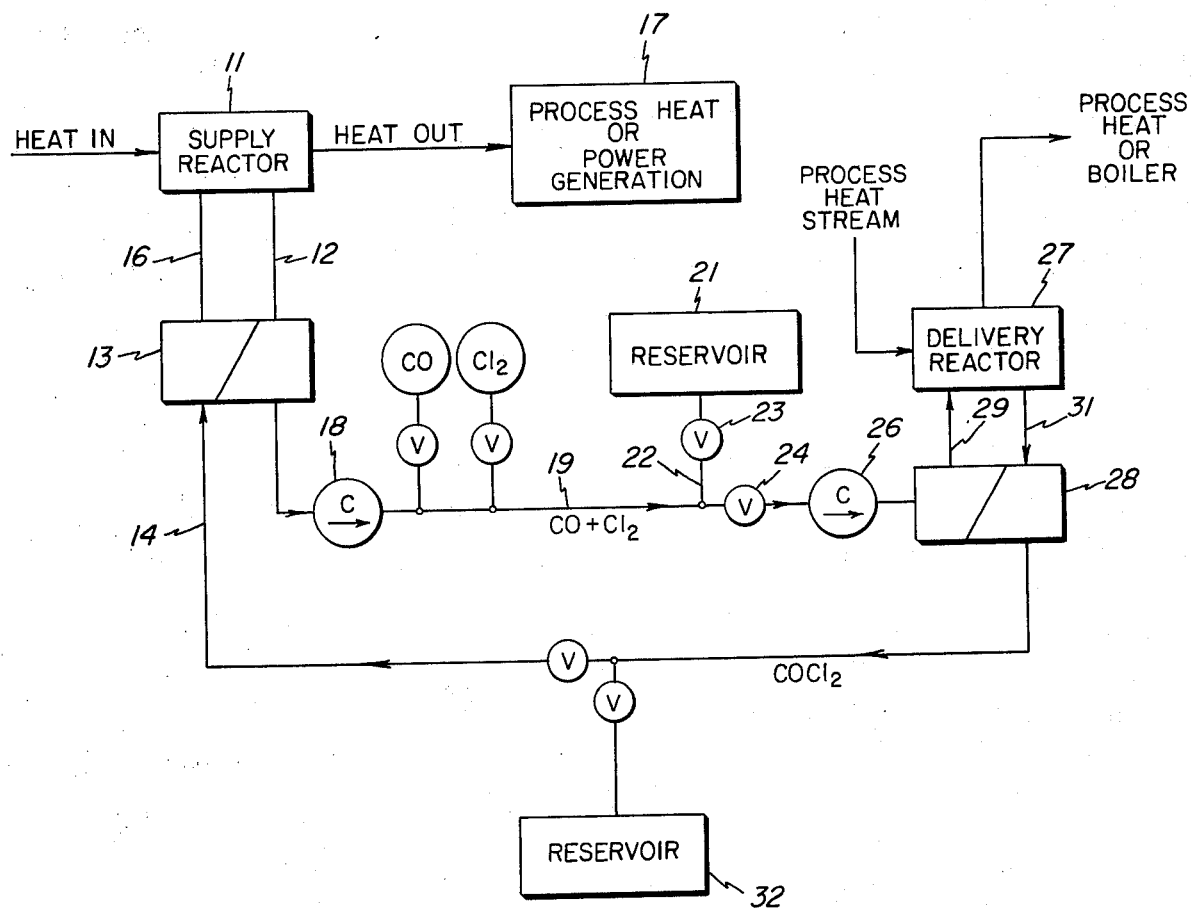

TRANSPORT OF HEAT AS CHEMICAL ENERGY

BACKGROUND OF THE INVENTION

As clean fossil fuels become less available, increasing attention is being given to alternate sources for electrical and thermal energy needs. At present, the most likely candidate for near future development is nuclear energy. The large size requirements and the siting difficulty connected with the nuclear reactor make it necessary to transmit energy over large distances (at least about 100 miles) to energy use areas. Commonly, the energy is transported as electricity via overhead wires. However, urban areas usually need energy for heat as well as for power and it is inefficient to convert heat energy into electrical energy and then back into heat energy even without considering the costs of transportation. Furthermore, despite a growing demand for urban electric power, rights-of-way for overhead power lines are becoming increasingly difficult to obtain. Underground transmission is much more expensive for the same electric power carrying capacity. When the distances from energy generating source to energy use area exceeds several hundred miles, very high voltages are required, thereby compounding the difficulties of transmitting electric power.

In recognition of these difficulties, the Kernforschungsanlage Julich (KFA) has proposed the utilization of a reversible chemical reaction having a large heat of reaction to produce gaseous products of high enthalpy content for the transmission of chemical energy at ambient temperature by underground pipelines from an energy source location to an energy use area. Transmission distances of as much as a thousand miles appear practical.

The KFA effort referred to hereinabove utilizes the chemical reactions:

1. $CH_4 + H_2O \rightarrow CO + 3H_2$ 
2. $CO + 3H_2 \rightarrow CH_4 + H_2O$ 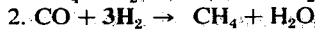

Reaction 1 is carried on at the heat source (i.e. a high temperature gas reactor), the methane and steam being heated and passed over a catalyst at about 800°–900°C (1100°–1200°K). As the reaction takes place, about 54.1 kcal/gram mol of CO formed is absorbed. The resulting gas mixture is then cooled rapidly by heat exchange with incoming methane and liquid water and is then pumped through a pipeline to the energy use area. At this location, the mixture of gases is reheated (e.g. 300°–500°C) and passed over a catalyst, whereupon considerable heat, about 52.7 kcal/gram mol of CO, is evolved in reaction 2. The reheating at the energy use area is accomplished by heat exchange with the methane/steam mixture leaving the energy delivery reactor. It is thereafter proposed that the methane will be dried and returned to the heat source, where it once again undergoes conversion to carbon monoxide and hydrogen.

Depending upon the requirements at the energy use area, varying distributions of high grade heat, electricity and low grade heat can be made from the system.

Reactions 1 and 2 are the well-known a) methanesteam reforming and b) methanation of CO reactions, respectively. However, the reduction of carbon monoxide by hydrogen can produce a wide variety of products. As is known from the various Fischer-Tropsch syntheses, assorted alcohols, ketones, ethers, aldehydes, esters, hydrocarbons, oils, waxes, etc. may result depending upon the catalyst and pressure and temperature conditions employed. Because of the likelihood of contamination, the large amount of water generated during the methanation reaction at the energy use end of the pipeline will have to be processed to remove any such contamination therefrom. This water will either have to be returned to the energy source for repetition of reaction 1, or will have to be supplied at the energy source location from other sources. If the water (in the liquid state) is to be returned to the energy source, this must be done by providing a third pipeline to avoid the difficulties (solid hydrate formation, problems of pumping a mixture of liquid and gas, freezing of the water) encountered in returning both water and methane through the same pipeline.

The instant invention, utilizing a different reversible chemical reaction, is proposed to overcome the aforementioned difficulties and enable operation at lower temperatures.

DESCRIPTION OF THE INVENTION

At a heat source, such as a nuclear reactor, phosgene is reacted (i.e., at about 700°C) to form a mixture of carbon monoxide and chlorine. This mixture of gases is cooled by heat exchange with incoming cold phosgene and is pumped through a first pipeline at ambient temperature to an energy use area. At the energy use end of the first pipeline the gas mixture is heated to a temperature (i.e., near, but below 550°C) in the presence of activated charcoal or platinum as a catalyst. The CO and $Cl_2$ react exothermically to form $COCl_2$ (phosgene) with the liberation of 26 kcal per mol of phosgene formed. The heat evolved from this reaction is released across a heat exchanger for the boiling of water and superheating of the resultant steam to a temperature in the 400°–500°C range for use as process heat or the generation of electricity. The phosgene produced is cooled and then returned to the heat source via a second pipeline for repetition of the closed loop process described.

BRIEF DESCRIPTION OF THE DRAWING

The exact nature of this invention as well as objects and advantages thereof will be readily apparent from consideration of the following specification relating to the annexed drawing diagrammatically illustrating conduct of the process of this invention.

MANNER AND PROCESS OF MAKING AND USING THE INVENTION

For the transmission of energy via pipeline according to the instant invention the reactions employed are as follows:

3. $COCl_2 \rightarrow CO + Cl_2$ 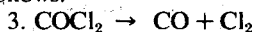
4. $CO + Cl_2 \rightarrow COCl_2$ 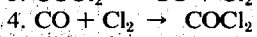

Reaction 3 is conducted at the heat source location at a temperature in about the 700°–750°C range (at 1 atmosphere), while reaction 4 is conducted at the energy use location at a temperature in the range of from about 275° to 700°C depending on the operating pressure. One pipeline is required to conduct the carbon monoxide/chlorine gas mixture from the heat source and another pipeline is required to return the phosgene to the heat source.

Reaction 3 is favored by low pressure, while reaction 4 is favored by high pressure. Pipeline and reaction pressures are to be in the range of 1–10 atmospheres. The heating medium after supplying the requisite heat for reaction 3 will still have a fairly high temperature and should be used to produce steam for local power generation.

Activated charcoal and platinum are useful catalysts for reaction 4. Also, this reaction is activated by either visible or ultraviolet light at all temperatures. No catalyst is needed at the supply end promote reaction 3. The reaction apparatus should not present nickel or iron surfaces to the system and, as well, carbides of transition metals of Groups IVB and VB should be kept out of the system. Thus, the reactor walls may have a ceramic liner or be made of stainless steel with an oxide surface.

Care in avoiding the materials so specified above in the system will greatly reduce the incidence of reactions 5) and 6):

5. $2COCl_2 \rightarrow CO_2 + CCl_4$
6. $2CO \rightarrow C_{solid} + CO_2$

Also, by maintaining a small percentage of $CO_2$ in the system, reaction 6) is further suppressed.

Those small amounts (less than 7½½% by volume) of $CCl_4$ that form from reaction 5) will be consumed at temperatures in excess of 700°C such as are encountered in the supply reactor.

Catalyst poisoning is not a problem, if sulfur is kept out of the system.

It is imperative that the gases be dry during transit and handling, particularly the carbon monoxide/chlorine mixture. Thus, an air-tight system will prevent the entry of water vapor from the air. If desired, either or both pipelines may be provided with a drier loop whereby on each pass a portion of the gas flow (e.g. 10%) volume passes through a drier. As long as these transport systems remain free of water, ordinary construction materials may be employed for the apparatus and pipeline construction.

While reaction 3 is endothermic, reaction 4 is exothermic and the heat released thereby is taken up by a separate process heat stream such as water (steam) or sodium metal, functioning to absorb heat and carry it to a boiler or turbine.

The cold mixture of carbon monoxide and chlorine behaves as a good energy storage medium. During periods of low demand, this mixture can be stored in reservoirs for release for periods of peak demand.

The same trench can be used for the outgoing and return pipelines for the gases, as well as for other conduits, for example power lines.

Phosgene condensation in the return pipeline can be avoided by keeping the temperature therein at about 10°C or higher.

Make-up gas will preferably have an oxygen/carbon ratio matching the prevailing oxygen/carbon ratio in the system. This ratio should be greater than 1.0 and, preferably will be about 1.1. Thus, the make-up gases can contain $CO_2$ in addition to the CO and $Cl_2$ to achieve the desired ratio.

Reaction 3 absorbs about 26 kcal per gram mol of $COCl_2$ dissociated and as reaction 4 proceeds about 26 kcal per gram mol of $COCl_2$ formed is released. Operation at higher pressures (up to 10 atm.) will allow higher temperature outputs as the $COCl_2$ is formed. Thus, thermodynamic investigation shows that about 10% $COCl_2$ generation is at 560°C at 1 atm. while 10% $COCl_2$ generation is at 700°C at 10 atm.

BEST MODE CONTEMPLATED

The simplified flow sheet set forth as the drawing shows the preferred arrangement for conduct of the process of the instant invention. Thus, heat supply reactor 11 is located adjacent the high temperature source, such as a nuclear reactor, producing helium gas at ~800°C. By countercurrent heat exchange with the helium gas, supply reactor 11 is heated to a maximum of about 750°C. As phosgene gas is received therein, reaction 3 occurs. The reaction products, carbon monoxide and chlorine, exit from supply reactor 11 via conduit 12 to heat exchanger 13, wherein these reaction products are cooled to a temperature below about 40°C. This cooling of the product gas mixture brings about simultaneous heating of the cold phosgene stream entering from pipeline 14, this heated phosgene being introduced to supply reactor 11 via conduits 16. Meanwhile, the helium flow having given up heat in reactor 11 and, thereby, having been cooled from its inlet temperature to a temperature of about 450°C is conducted into boiler 17 wherein the temperature of the helium flow is reduced to about 200°C. This heat release is utilized for the generation of steam for local heating and electric power requirements.

The cooled flow of mixed carbon monoxide and chlorine gases is pressurized in compressor 18 and, thereafter, enters pipeline 19 for its long journey to the energy use area. When demand is low at the energy use area, some or all of the compressed carbon monoxide/chlorine gas mixture will be caused to enter reservoir 21 via line 22 and valve 23 (with valve 24 being appropriately set).

One or more additional compressors 26 will generally be required to meet the demands of pressurization for the conduct of reaction 4 in delivery (heat release) reactor 27. The mixture of carbon monoxide and chlorine, preferably pressurized to about 10 atmospheres, enters heat exchanger 28 in which the gas mixture is heated, preferably to about 500°C. When the heated, pressurized, gas mixture reaches delivery reactor 27 (via conduit 29) heat is released according to exothermic reaction 4 occurring over the activated carbon catalyst. This heat release is taken up by a separate fluid stream in countercurrent heat exchange relationship with the reacting gases in the reaction volume and this heated fluid stream, preferably steam, carries this heat either to end use as process heat or to a boiler or turbine for the local generation of electrical power.

The phosgene resulting from reaction 4 is conducted from reactor 27 to heat exchanger 28 via conduit 31 for cooling thereof and simultaneous heating of the fluids from pipeline 19. The phosgene gas passes from heat exchanger 28 to pipeline 14 for the return trip. The pipeline should be disposed or protected so that the temperature of the $COCl_2$ remains above about 10°C. As in the case of pipeline 19, amounts of this cold gas mixture may be stored in, or removed from, reservoir 32 at desired times. Cold phosgene gas arriving at the heat source location is ready to be heated in heat exchanger 13 preparatory to entering supply reactor 11 for the conduct of reaction 3.

What I claim as new and desire to secure by Letters Patent of the United States is:

1. The process for transporting energy from a source of heat to an energy use area comprising the steps of:
  a. decomposing phosgene adjacent said heat source at a temperature in excess of about 700°C to produce a gas mixture consisting principally of carbon monoxide and chlorine, b. cooling said gas mixture to a temperature below about 40°C, c. pressurizing and transporting said gas mixture through a first conduit to said energy use area, d. heating said gas mixture, e. reacting said gas mixture in the presence of a catalyst at a temperature of at least about 250°C and a pressure of at least one atmosphere to release heat and yield principally phosgene gas, f. cooling the phosgene gas to a temperature in the range of from about 10°C to about 40°C, g. conducting said phosgene gas through a second conduit to said heat source, h. heating said phosgene gas and i. repeating the series of steps set forth above.

2. The process of claim 1 wherein heat released in step b) is used in step h) via a heat exchange means.

3. The process of claim 1 wherein the gas mixture is reacted at a pressure in the 2–10 atmosphere range.

4. The process of claim 1 wherein heat released in step f) is used in step d) via heat exchange means.

5. The process of claim 1 wherein the oxygen/carbon ratio for the gases entering into the process is greater than 1.0.

6. The process of claim 5 wherein the oxygen/carbon ratio is about 1.1.

* * * * *